Nov. 4, 1930.  H. MEYER  1,780,495
DRIVING MECHANISM USED IN CONNECTION WITH DENTAL TOOLS
Filed March 6, 1928
Fig. 1.
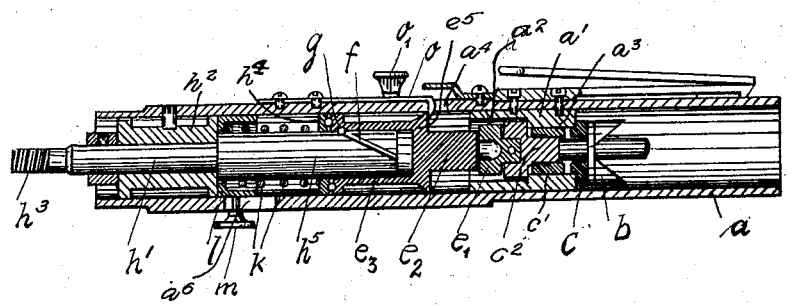
Fig. 2.
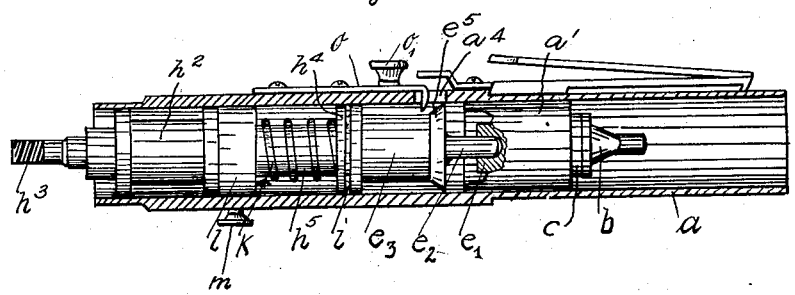
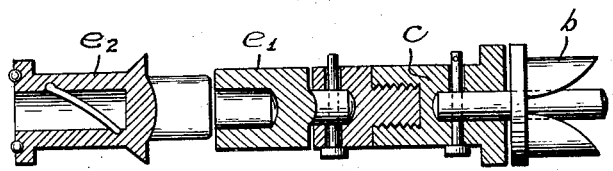
Fig. 3.
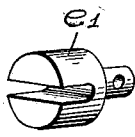
Fig. 4.
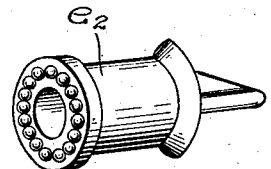
Fig. 5.
Inventor:
Henry Meyer
BY Jno. Imirie
atty.

Patented Nov. 4, 1930

1,780,495

UNITED STATES PATENT OFFICE

HENRY MEYER, OF HAMBURG, GERMANY

DRIVING MECHANISM USED IN CONNECTION WITH DENTAL TOOLS

Application filed March 6, 1928, Serial No. 259,591, and in Germany March 7, 1927.

This invention relates to driving mechanism used in connection with dental tools.

It frequently happens when drilling a tooth the drill sticks and it is thrown out of alignment which frequently causes slipping of the tool and suffering to the patient.

The object of this invention is to provide means used in connection with dental tools, whereby, in case a drill should stick, the means will automatically disconnect the drill from the source of power without liability of the drill becoming damaged or operating to injure the mouth of a patient.

The invention also comprehends improvements in the details of construction and arrangement of parts to be hereinafter described and particularly pointed out in the claims.

In the drawing:

Figure 1 is a vertical section illustrating the device in uncoupled position.

Figure 2 is a similar view partly in elevation showing the device in coupled position.

Figs. 3, 4, and 5 are detail views of the clutch elements.

In the accompanying drawing, $a$ indicates an elongated cylindrical casing. Secured in the casing $a$ is a bushing $a^1$ having a bore $a^2$ reduced at $a^3$. Mounted to rotate in the reduced portion $a^3$ of the bore is the hub $c^1$ of a tool holder $c$ provided at its free end at $b$ with means to cooperate with a tool or other implement. $e_1$ is a clutch member housed in the bore $a^2$ and formed with a reduced end, engaging in the threaded portion of the hub $c^1$.

In the opposite end of the casing $a$ is a fixed bushing $h^2$, forming a bearing for the reduced portion $h^1$ of a power driven shaft connected at $h^3$ to the usual flexible shaft. The inner end of the power driven shaft is enlarged as shown at $h^5$, the enlarged portion abutting against the bushing $h^2$, and retained in position by a fixed collar bearing against the outer end of the bushing $h^2$; that is to say, the power driven shaft $h$ is held against endwise movement relative to the bushing $h^2$. The enlarged portion $h^5$ of the shaft is formed with a spiral groove $f$, and fitting over the inner end of said shaft is the hub portion $e_3$ of a clutch member $e_2$. The hub is formed with a seat for a ball $g$, the latter also seating in the spiral groove $f$, as best shown in Figure 1 of the drawing. At the outer end of the hub $e_3$ is a collar $h^4$, ball bearings being interposed between the collar and the hub. The collar serves as a bearing for the inner end of a spring $k$, the outer end of said spring bearing against a cup shape collar $l$ mounted on the enlarged portion $h^5$ of the power driven shaft. The cup shape collar is provided with a screw extension which projects through a slot $a^6$ in the casing, and receives an adjusting nut $m$. The inner end of the hub $e_3$ is provided with a beveled flange $e^5$, with which a latch $o$ extending through a slot $a^4$ in the casing cooperates. The latch is secured to the casing and may be operated through the medium of a finger piece $o_1$.

The clutch members $e_2$, $e_1$ cooperate to effect connection between the power driven shaft and the tool holder, as will presently appear.

When the parts are in the position shown in Figure 1, the clutch members are disconnected. This takes place when the drill sticks, and due to this fact it creates a resistance on the tool holder and its clutch member. As the power driven shaft continues to rotate, the clutch member $e_2$ and its hub, through the medium of the ball $g$ and spiral groove $f$, will be fed outwardly and separate the two clutch members as shown. While the clutch members are separating, the beveled flange $e^5$ forces the latch $o$ out of its path and by the time the members become disengaged, the latch springs behind the flange and holds it in disengaged position.

The feeding outwardly of the clutch member by the ball and spiral groove compresses the spring $k$, the tension of which is regulated by the adjustment of the collar $l$ and nut $m$. Hence, when the difficulty incident to the sticking of the drill has been removed, and the latch $o$ is released, the spring will force the clutch member $e_2$ into clutching position as clearly shown in Figure 2.

Obviously, the construction described provides simple and useful automatic means for disconnecting the tool from the power driven shaft when a drill sticks, and means for holding the clutch members separated, with means for readily engaging the clutch members when the difficulty with the drill has been removed.

What I claim is:

1. In combination, a casing, a power driven shaft mounted in the casing, said shaft having a spiral groove, a clutch member slidably mounted on the end of said shaft, a ball seated between the clutch member and the spiral groove, a second clutch member mounted in the casing in alignment with the first mentioned clutch member, a tool holder carried by the second mentioned clutch member, a spring for normally moving the first mentioned clutch member to engage the second mentioned clutch member, and an automatically operated latch for holding the first mentioned clutch member out of engagement with the second mentioned clutch member.

2. In combination, a casing, a bushing mounted in the casing, a power driven shaft having a reduced extension mounted in the bushing, said shaft having a spiral groove, a cup shape flange mounted on the power driven shaft, a clutch member having a sleeve mounted on the end of the power driven shaft, a ball seated between the sleeve and the spiral groove, a spring between the sleeve and the cup shape member, the sleeve having a beveled flange, a spring actuated latch on the casing to automatically ride over the clutch member when the latter is moved against the tension of the spring, whereby to hold said clutch member in inoperative position, a second clutch member mounted in the casing in alignment with the first mentioned clutch member, and a tool holder carried by the end of the second mentioned clutch member.

3. In combination, a casing, two clutch members mounted in longitudinal alignment in the casing, one of said clutch members having a longitudinal movement in the casing, means associated with the movable clutch member and actuated when the other of said clutch members meets a resistance, to cause said movable clutch member to move away from the other clutch member, a resilient latch mounted on the casing to automatically engage the movable clutch member and hold it separated from the other said clutch member.

In testimony whereof I affix my signature.

HENRY MEYER.